Figure 1:
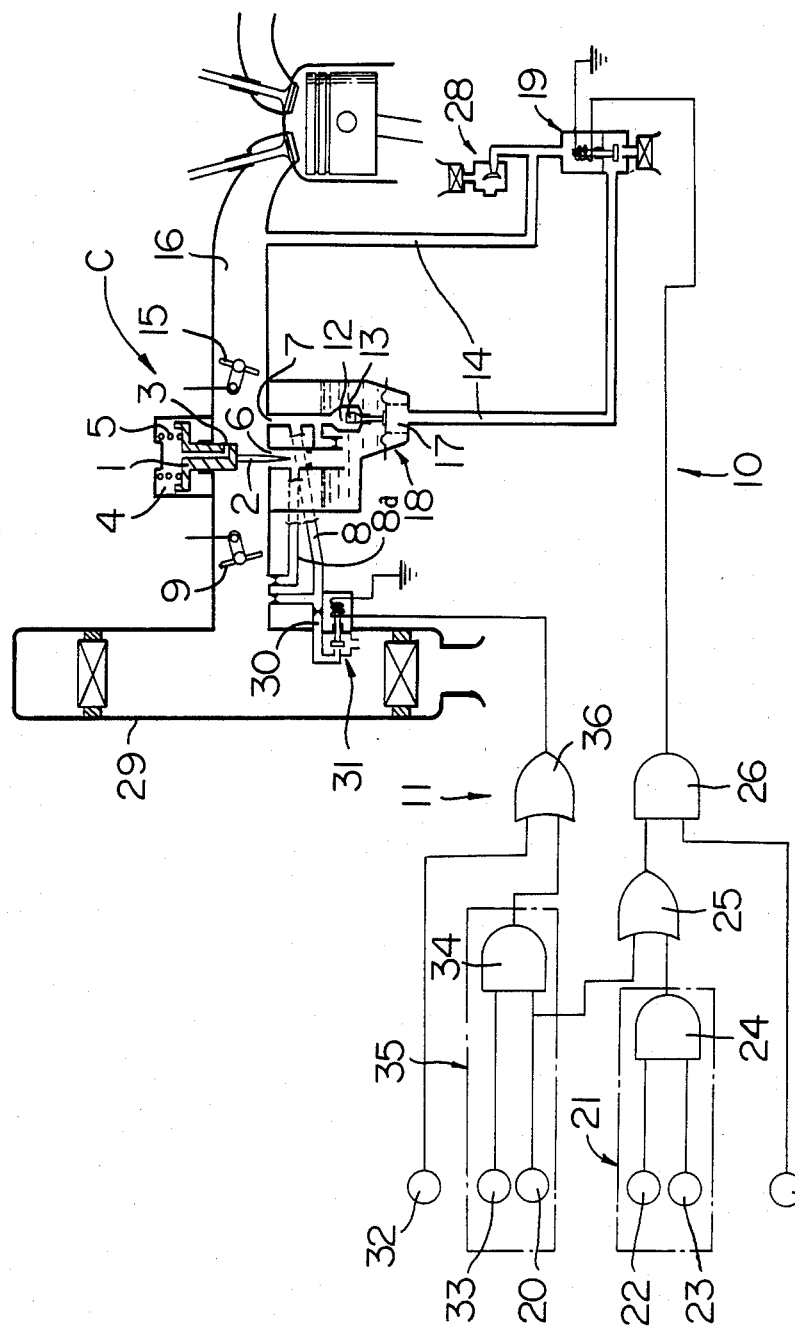

United States Patent [19]

Kishida et al.

[11] Patent Number: 4,563,990
[45] Date of Patent: Jan. 14, 1986

[54] FUEL SUPPLY CONTROL SYSTEM FOR ENGINE CARBURETORS

[75] Inventors: Eiji Kishida, Tokyo; Hideo Kobayashi; Kano Hidekazu, both of Saitama, all of Japan

[73] Assignee: Honda Giken Kogyo Kabushiki Kaisha, Tokyo, Japan

[21] Appl. No.: 554,883

[22] Filed: Nov. 23, 1983

[30] Foreign Application Priority Data

Nov. 24, 1982 [JP] Japan ................ 82-204512

[51] Int. Cl.$^4$ ............................................ F02M 7/12
[52] U.S. Cl. .................................... 123/438; 123/437; 123/439
[58] Field of Search ................ 123/439, 438, 437

[56] References Cited

U.S. PATENT DOCUMENTS

| | | | |
|---|---|---|---|
| 3,706,444 | 12/1972 | Masaki et al. | 123/438 |
| 3,906,910 | 9/1975 | Szlaga, Jr. | 123/439 |
| 4,314,535 | 2/1982 | Takeuchi et al. | 123/439 |
| 4,349,877 | 9/1982 | Oyama et al. | 123/439 |
| 4,452,209 | 6/1984 | Ohara et al. | 123/438 |
| 4,457,279 | 7/1984 | Teramura et al. | 123/439 |

FOREIGN PATENT DOCUMENTS 52-72025  6/1977  Japan ................ 123/438

Primary Examiner—Andrew M. Dolinar
Attorney, Agent, or Firm—Lyon & Lyon

[57] ABSTRACT

A fuel supply control system for a vehicle engine carburetor and particularly a carburetor that includes a variable venturi portion and fixed venturi or nozzle portion. The system includes a fuel valve for supplying additional fuel to the nozzle under low speed or high load conditions sensed by elements responsive to those conditions. The system also includes an air valve for controlling the air supplied to the nozzle and a sensor for closing the air valve to thereby also increase the fuel supplied to the nozzle under high load conditions. Other sensors of engine temperature also control the operation of the fuel and air valves.

10 Claims, 1 Drawing Figure

FUEL SUPPLY CONTROL SYSTEM FOR ENGINE CARBURETORS

The present invention relates to a system for controlling the fuel supplied through a carburetor and, in particular, a variable venturi type carburetor.

A variable venturi type carburetor with which a fixed venturi (i.e. primary venturi) is integrally combined is well known in the prior art. The variable venturi type carburetor has the advantage that it provides desirable mixture ratio controlling characteristics because the venturi piston forming the variable venturi of the carburetor is lifted upon a higher suction of intake air than a predetermined rate so that the variable venturi type carburetor has, in addition, the operation of the fixed venturi type carburetor. Since the stroke of the venturi piston may be made smaller than that of variable venturi type carburetor without a fixed venturi portion, the additional advantage that the height of the suction chamber can be made small is achieved. Further, since it is provided with the fixed venturi portion, the strict degree of machining accuracy of the variable venturi type carburetor, especially, its needle valve jet and its jet needle is not required.

However, the variable venturi type carburetor having the aforementioned advantages may fail to increase the fuel supplied even when the throttle valve is fully opened during a low engine speed operation, such as while the vehicle is ascending a slope, because the rate of intake air does not increase sufficiently and therefore the venturi piston may fail to rise. As a result, a disadvantage may occur for the running operation because the fuel is not increased. This makes it necessary to use another fuel supply increasing device. Moreover, from the standpoints of the fuel economy, the drivability and other characteristics, it is necessary to control the air-fuel ratio in accordance with the running conditions of the engine.

The present invention has an object to solve the subject problems of variable venturi type carburetors as thus far described and, in particular, for a variable venturi type carburetor in which a venturi piston is lifted for a higher suction of intake air than a predetermined rate by the action of a vacuum of said venturi portion thereby to enlarge the opening area of said venturi portion by providing a fuel supply control system comprising first and second fuel increasing means made operative such that the first means increases the fuel within a low-speed range whereas the first and second means combine to increase the fuel within a high-load range.

The present invention will be described in connection with an embodiment thereof illustrated in the single accompanying drawing which is a block diagram of the fuel control system and diagrammatic illustration of the carburetor and engine components.

The carburetor C includes a variable venturi portion having a venturi piston 1 which is equipped at its leading end with a jet needle 2 and a vacuum port 3. During engine operation, a vacuum is introduced from the vacuum port 3 into a chamber 4 above said venturi piston 1 to cause lifting of the piston 1 in response to the magnitude of the vacuum and which is resisted by the spring 5 thereby forming the variable venturi. Indicated at numeral 6 is a needle valve jet into and out of which the aforementioned jet needle 2 is moved upon movement of the piston 1. The carburetor C is also provided with main venturi nozzle 7 corresponding to fixed venturi portion of this type of conventional carburetor. A main air bleed passage 8 is connected between upstream of a choke valve 9 in the air intake and the main nozzle 7. Similarly, the needle valve jet 6 is also provided in its fuel passage portion with an air bleed passage 8a which also is disposed upstream of the choke valve 9.

The description thus far is not especially different from the variable venturi type carburetor of the prior art, which is combined with a fixed venturi. To the carburetor thus far described, according to the present invention, there are added a first fuel supply increasing device 10, which is made operative to increase the fuel during low-speed and high-load ranges, and a second fuel supply increasing device 11 which is made operative to increase the fuel during the high-load range.

More specifically, the aforementioned first fuel increasing device 10 includes a fuel increase control valve, generally designated 18, which is equipped with a valve 13 disposed in an auxiliary or bypass fuel passage 12 formed in the main nozzle 7 in addition to the normal fuel passage (not numbered) to nozzle 7 and which valve 18 is formed with a vacuum chamber 17 having communication through a vacuum passage 14 with the intake pipe 16 downstream of a throttle valve 15. A solenoid valve 19 is disposed in the vacuum passage 14 for acting as a controller. Detecting means 20 and 21 are provided for detecting the engine operation low-speed and high-load ranges respectively. The solenoid valve 19 vents said passage 14 to the atmosphere when it is energized by the outputs of said low-speed and high-load range detecting means 20 and 21. As a result, the vacuum chamber 17 of the aforementioned fuel increase control valve 18 is vented to the atmosphere causing an increase in pressure in chamber 17 to open the valve 13 thereby to increase the fuel being supplied to the main nozzle 7 to the maximum. When said detecting means 20 and 21 are not operative to energize the solenoid valve 19, the valve 19 opens the aforementioned vacuum passage 14 to establish communication between the vacuum chamber 17 and the intake pipe 16 so that the aforementioned fuel increase control valve 18 functions to only increase the fuel supplied to nozzle 7 inversely in response to the vacuum in the intake pipe 16 that is, as the vacuum increases (i.e. lower absolute pressure) the fuel supplied through valve 18 decreases.

The aforementioned low-speed range detecting means 20 is exemplified by a vehicular speed switch which is made operative to generate an ON signal for a vehicular speed lower than a predetermined value, such as 24 Km/h for example. The aforementioned high-load range detecting means 21 is comprised of: a vacuum switch 22, which is made operative to generate an ON signal for a vacuum lower than a predetermined value, such as $-150$ mmHg for example, a vehicular speed switch 23 for generating an ON signal for a vehicular speed lower than a predetermined value, such as 75 Km/h for example, and an AND gate 24. As a result, the high-load range detecting means 21 is made operative to generate its ON signal under the high-load state in which the vehicular speed is lower than 75 Km/h and in which the vacuum in the intake pipe 16 is lower than $-150$ mmHg. The output of the low-speed range detecting means 20 or the high-load range detecting means 21 is fed through an OR gate 25 to an AND gate 26, which is connected with an engine cooling water temperature switch 27 that is operative to generate an ON signal when the water temperature is equal to or lower than 90° C. Thus, when the engine is in an overheated state, the ON signal of said low-speed range detecting means 20 or said high-load range detecting means 21 is not fed, even if it is generated, to the solenoid valve 19 and therefore the fuel supply is not increased to the maximum since valve 18 will not be opened to the maximum.

A temperature valve 28 is connected with the aforementioned air passage 14 for venting said vacuum passage 14 to the atmosphere when the engine water temperature is too low, e.g., at or below 40° C.

The aforementioned second fuel supply increasing device 11 includes a solenoid valve 31, disposed in an air bypass passage 30 having its one end connected to the main air bleed passage 8 from main nozzle 7 and its other end connected to the inside of an air cleaner 29, and a vacuum switch acting as a low-vacuum range detecting means 32 for generating an ON signal within the high-load range in which the intake vacuum is lower than a predetermined value, such as −100 mmHg. During the high-load range of operation in which the intake vacuum is lower than −100 mmHg, for example, the solenoid valve 31 is closed in response to the output of the aforementioned detecting means 32. When the detecting means 32 is inoperative as a result of a vacuum higher than −100 mmHg, the solenoid valve 31 opens to vent the bypass passage 30 to the atmosphere so that the air-fuel ratio at the main nozzle 7 is raised to a high value by introducing additional air through bleed passage 8 and which reduces the supply of fuel that would otherwise be introduced through nozzle 7.

In addition, the solenoid valve 31 may be controlled by engine speed and temperature. An engine cooling water temperature switch 33 is operative to generate an ON signal for a predetermined low temperature, such as lower than 70° C., for example. The engine cooling water temperature switch 33 constitutes, together with the vehicular speed switch 20 and an AND gate 34, a detecting means 35 for detecting the running state in which the engine is started at a low temperature and run at a low speed, whereupon the valve 31 will be closed to provide an increase of fuel supplied over that which occurs upon exceeding such temperature and speed values causing opening of valve 31.

The various states of operation of the embodiment will be described in the following. For a condition with the engine cooling water temperature not higher than 90° C. and the vehicular speed not higher than 24 Km/h, the ON signal of the vehicular speed switch 20 is fed through the OR gate 25 and the AND gate 26 to the solenoid valve 19 to vent the air passage 14 to the atmosphere. As a result, the fuel increase control valve 18 operates to open the valve 13 so that the fuel to the main nozzle 7 is increased to the maximum. Thus, during the low vehicular speed range after the engine warm-up, the air-fuel ratio is decreased so that the accelerability to a predetermined vehicular speed can be improved.

In the running state in which (1) the load is high with the throttle valve 15 being fully opened, (2) the vacuum is equal to or lower than −150 mmHg, for example, (3) the vehicular speed is lower than 75 Km/h, for example, and (4) the engine cooling water temperature is equal to or lower than 90° C., both the vacuum switch 22 and the vehicular speed switch 23 generate the ON signals, which are fed through the OR gate 24 and the AND gate 26 to the solenoid valve 19 to vent said air passage 14 to the atmosphere so that the fuel of the main nozzle 7 is increased to the maximum like in the aforementioned operation. In addition, since the vacuum is lower than −100 mmHg the vacuum switch 32 generates an ON signal, which is fed through an OR gate 36 to close the solenoid valve 31 thereby to block the bypass passage 30 from the atmosphere so that the fuel is increased. Thus, in the case of the running state under discussion, the first and second fuel increasing devices 10 and 11 operate together to increase the fuel so that the drivability can be improved.

When the engine is operating in a low temperature state with the engine water at a temperature equal to or lower than 40° C., namely, during the warming-up operation, the engine cooling water temperature valve 28 vents the vacuum passage 14 to the atmosphere so that the fuel increase control valve 18 operates to increase the fuel. Moreover, in case the engine is operating at a temperature ranging from 40° C. to 90° C. and the vehicular speed is equal to or lower than 24 Km/h, namely, in case the engine is both started at a low temperature and the vehicle is run at a low speed, the vehicular speed switch 20 and the engine cooling water temperature switch 27 generate together their ON signals, which are fed through the AND gate 26 to the solenoid valve 19 to vent said vacuum passage 14 to the atmosphere to open the fuel increase control valve 18, as in the foregoing operation, whereby the first fuel increasing device 10 increases the fuel. In addition, if the engine cooling water temperature is equal to or lower than 70° C. and the vehicular speed is equal to or lower than 24 Km/h, the engine cooling water temperature switch 33 and the vehicular speed switch 20 generate together their ON signals, which are fed through the AND gate 34 and the OR gate 36 to the solenoid valve 31 to shut off the bypass passage 30 so that the fuel is also increased. Thus, the engine can have its stability improved even at a low temperature and its warm-up completed at an early stage.

Although nothing is shown in the diagram of the embodiment thus far described, it is contemplated that the system will include a conventional arrangement for supplying air to the exhaust system to reduce emission of hydrocarbons at the aforementioned low temperature, and an exhaust gas recirculation system (EGR) or the like may be used in combination to help solve problems such as the drivability or the fuel consumption rate.

As has been described hereinbefore, according to the present invention, in the variable venturi type carburetor in which the venturi piston is lifted for a higher suction of intake air than the predetermined rate by the action of the vacuum of said venturi portion thereby to enlarge the opening area of said venturi portion, there is provided the fuel supply control system for the engine, comprising the first and second fuel increasing means made operative such that the first means increases the fuel within the low-speed range whereas the first and second means increase together the fuel within the high-load range. As a result, the drivability is solved within the low-speed range, and the accelerability is improved within the high-load range. In the region other than the low-speed range in which no output is required, the air-fuel ratio is reduced without increasing the amount of fuel so that the fuel economy can be improved.

What is claimed:

1. In a fuel supply control system for a vehicle internal combustion engine having a variable venturi type carburetor with a fixed main nozzle and a variable nozzle in which a higher suction of intake air than a predetermined rate increases the opening area of the variable nozzle, comprising, separate first and second fuel supply increasing means connected to said main nozzle for selectively increasing the amount of fuel supplied through said main nozzle, means operative to cause said first means to increase the fuel supply within a low-speed range of vehicle operation and to cause said first and second means to increase the fuel supply within a high-load range of engine operation.

2. The fuel supply control system of claim 1, wherein said first fuel supply increasing means includes, a fuel increase control valve disposed in a bypass fuel passage formed in the main nozzle of the carburetor for opening and closing said bypass fuel passage, low-speed and high-load range detecting means for respectively detecting the vehicle low-speed and engine high-load ranges; and control means made responsive to the respective outputs of said detecting means for controlling said fuel increase control valve.

3. The fuel supply control system of claim 2, wherein said second fuel increasing means includes, a valve disposed in the bypass passage of a main air bleed for venting and blocking said bypass passage to and from the atmosphere which is responsive to said high-load range detecting means to be controlled by the output of said high-load range detecting means.

4. In a fuel supply control system for a vehicle engine carburetor with a normal fuel supply passage to a nozzle in a venturi portion, comprising, means for detecting low vehicle speed and high engine load conditions, a first fuel supply increasing means connected to the nozzle and having means responsive to an engine operating condition of either low vehicle speed or high-load on the engine to cause an increase in fuel supplied to the nozzle under either said condition, and a separate second fuel supply increasing means connected to the nozzle and having means responsive to a high load on the engine to cause an increase in fuel supplied to the nozzle under said condition.

5. In a fuel supply control system for a vehicle engine carburetor with a normal fuel supply passage to a nozzle in a venturi portion leading to the engine intake pipe, comprising, a fuel bypass passage connected to the nozzle for supplying fuel to the nozzle in addition to the normal fuel supply to the nozzle, a fuel valve in said fuel bypass passage for controlling the fuel supplied therethrough, means for operating said fuel valve including means responsive to engine operating characteristics, an air bypass passage connected to the nozzle for supplying air to the nozzle in addition to the normal air supply to the nozzle, an air valve in said air bypass passage for controlling the air supplied therethrough, means for operating said air valve including means responsive to engine operating characteristics, said responsive means for the fuel valve operating means causing opening of said fuel valve upon the occurrence of either high engine load or low vehicle speed, and said responsive means for the air valve operating means causing closing of said air valve upon the occurrence of either high engine load or both low vehicle speed and low engine temperature.

6. The fuel supply control system of claim 5 wherein, said responsive means for the fuel control valve include means responsive to the engine temperature for causing opening of said fuel valve below a predetermined engine temperature.

7. The fuel supply control system of claim 5 wherein, said responsive means for the fuel control valve include means responsive to the engine temperature for preventing the occurrence of either high engine load or low vehicle speed to cause the opening of said fuel valve above a predetermined engine temperature.

8. The fuel supply control system of claim 5 wherein, said responsive means for the air control valve include means responsive to vehicle speed and engine temperature for causing closing of said air valve upon the occurrance of low vehicle speed and low engine temperature.

9. The fuel supply control system of claim 5 wherein means are provided for controlling the operation of said fuel valve in response to the vacuum in the intake pipe to the engine under engine and vehicle operating characteristics other than low vehicle speed and high engine load.

10. The fuel supply control system of claim 5 wherein said fuel valve operating means includes vacuum reponsive operating means for causing the opening and closing of said fuel valve and solenoid valve means for venting said vacuum responsive operating means to atmosphere.

* * * * *

UNITED STATES PATENT AND TRADEMARK OFFICE
CERTIFICATE OF CORRECTION

PATENT NO. : 4,563,990

DATED : January 14, 1986

INVENTOR(S) : Eiji Kishida, Hideo Kobayashi & Hidekazu Kano

It is certified that error appears in the above-identified patent and that said Letters Patent is hereby corrected as shown below:

On the title page:

Please correct the name of the third inventor from "Kano Hidekazu" to --Hidekazu Kano--.

Signed and Sealed this

Nineteenth Day of August 1986

[SEAL]

Attest:

DONALD J. QUIGG

Attesting Officer

Commissioner of Patents and Trademarks